US008817095B2

(12) United States Patent
Diroo et al.

(10) Patent No.: US 8,817,095 B2
(45) Date of Patent: *Aug. 26, 2014

(54) LOCALLY ORIGINATED IPTV PROGRAMMING

(71) Applicant: AT&T Intellectual Property I, LP, Atlanta, GA (US)

(72) Inventors: Yolius Diroo, San Antonio, TX (US); Steven M. Wollmershauser, San Antonio, TX (US); Edward Walter, Boerne, TX (US)

(73) Assignee: AT&T Intellectual Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/903,065

(22) Filed: May 28, 2013

(65) Prior Publication Data

US 2013/0263175 A1    Oct. 3, 2013

Related U.S. Application Data

(63) Continuation of application No. 11/508,011, filed on Aug. 21, 2006, now Pat. No. 8,471,903.

(51) Int. Cl.
| | |
|---|---|
| *H04N 7/18* | (2006.01) |
| *H04L 23/02* | (2006.01) |
| *H04L 5/12* | (2006.01) |
| *G06F 3/038* | (2013.01) |
| *G09G 5/00* | (2006.01) |
| *G06F 13/00* | (2006.01) |
| *G06F 15/16* | (2006.01) |
| *H04L 29/06* | (2006.01) |
| *H04N 21/472* | (2011.01) |
| *H04N 7/52* | (2011.01) |
| *H04N 21/4147* | (2011.01) |
| *H04N 21/61* | (2011.01) |
| *H04N 21/266* | (2011.01) |
| *H04N 7/173* | (2011.01) |
| *H04N 21/426* | (2011.01) |

(52) U.S. Cl.
CPC ........ *H04N 21/6175* (2013.01); *H04L 65/4076* (2013.01); *H04N 21/47202* (2013.01); *H04L 29/06027* (2013.01); *H04N 7/52* (2013.01); *H04N 21/4147* (2013.01); *H04N 21/6125* (2013.01); *H04N 21/26616* (2013.01); *H04N 7/17318* (2013.01); *H04N 21/42646* (2013.01)
USPC ........... 348/143; 375/262; 345/214; 710/104; 709/233

(58) Field of Classification Search
USPC ......................................................... 348/143
See application file for complete search history.

(56) References Cited

U.S. PATENT DOCUMENTS 6,538,689 B1    3/2003   Chang
6,751,214 B1 *  6/2004   Parruck et al. ................ 370/352

(Continued)

FOREIGN PATENT DOCUMENTS

EP    1115264    7/2001
WO    2008024338    2/2008

OTHER PUBLICATIONS

"International Application Serial No. PCT/US2007/018472", International Search Report mailed Feb. 27, 2008, 6 pgs.

(Continued)

*Primary Examiner* — Hee-Yong Kim
(74) *Attorney, Agent, or Firm* — Guntin & Gust, PLC; Joseph Hrutka

(57) ABSTRACT

In an embodiment, a third party video content database is coupled to an IPTV network. The IPTV network includes a plurality of set top boxes (STBs). The third party video content database is mapped to the IPTV network via an IP address of the third party content database, and it is associated with an assigned channel on the IPTV network. One or more STBs of the IPTV network have access to the assigned channel.

20 Claims, 6 Drawing Sheets

(56) References Cited

U.S. PATENT DOCUMENTS

| | | |
|---|---|---|
| 6,774,926 B1 | 8/2004 | Ellis |
| 7,483,946 B2 | 1/2009 | Boyd |
| 2001/0044855 A1 | 11/2001 | Vermeire |
| 2002/0059621 A1 | 5/2002 | Thomas |
| 2002/0104099 A1 | 8/2002 | Novak |
| 2003/0037335 A1* | 2/2003 | Gatto et al. .................. 725/86 |
| 2003/0163818 A1 | 8/2003 | Armstrong |
| 2004/0114036 A1 | 6/2004 | Karaoguz |
| 2004/0117845 A1 | 6/2004 | Karaoguz |
| 2005/0232210 A1 | 10/2005 | Karaoguz |
| 2005/0246752 A1 | 11/2005 | Liwerant |
| 2006/0048185 A1 | 3/2006 | Alterman |
| 2006/0053456 A1 | 3/2006 | Kelly |
| 2006/0064716 A1 | 3/2006 | Sull |
| 2006/0123455 A1 | 6/2006 | Pai |
| 2006/0190589 A1 | 8/2006 | Parker |
| 2006/0209857 A1 | 9/2006 | Hicks |
| 2007/0239825 A1 | 10/2007 | Walter |

OTHER PUBLICATIONS

"International Application Serial No. PCT/US2007/018472", Written Opinion mailed Feb. 27, 2008, 7 pgs.

* cited by examiner

LOCALLY ORIGINATED IPTV PROGRAMMING

CROSS-REFERENCE TO RELATED APPLICATIONS

This application is a continuation of and claims priority to U.S. patent application Ser. No. 11/508,011 filed Aug. 21, 2006 which is incorporated herein by reference in its entirety.

FIELD OF THE DISCLOSURE

Various embodiments relate to the field of Internet Protocol Television (IPTV) systems, and in an embodiment, but not by way of limitation, to locally originated IPTV programming.

BACKGROUND OF THE DISCLOSURE

Video content can be distributed to a plurality of viewers in several ways. The system and method of broadcasting over the public airways has long been established and enjoyed by literally millions of people worldwide. However, shortcomings such as limited transmission distance, poor reception quality, and limited bandwidth and channel availability, led to the installation of cable and satellite television systems in recent years. Satellite and cable systems offer greater bandwidth and channel availability, and higher quality reception. Broadcast, satellite and cable television systems have of course been used for commercial television broadcasts, but also have been used for the open and closed circuit transmission of university classes, religious broadcasts, corporate meetings, sporting events, and the like. With the development of the Internet and other public and private Internet Protocol (IP) networks, IP Television (IPTV) systems have become the most recent mechanism for distributing video content to a plurality of users.

DETAILED DESCRIPTION OF THE DRAWINGS

Figure 1:
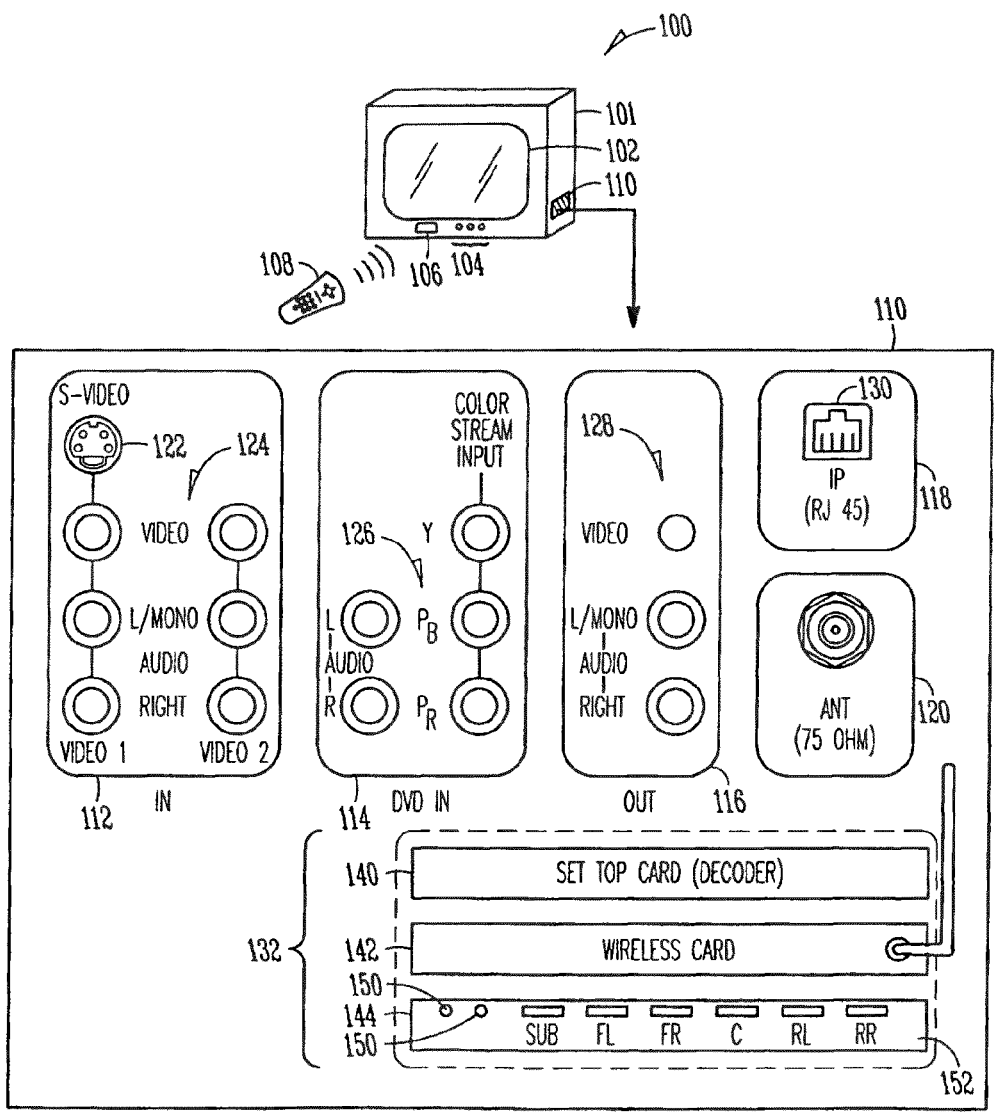
FIG. 1 illustrates an embodiment of a multimedia processing device such as a networked television.

Referring to FIG. 1, an example embodiment of a multimedia processing device such as a networked television 100 is illustrated in accordance with at least one embodiment of the present disclosure. As depicted, the television 100 includes a housing 101 that contains a display 102 (e.g., a liquid crystal display or a plasma display). Further, the housing 101 includes a plurality of user interface buttons 104, such as a power button, channel change buttons, volume control buttons, and the like. The housing 101 also includes a remote control interface 106, for example an infrared interface or a radio frequency (RF) interface, to receive remote control commands from a remote control 108. In a particular embodiment, one or more operations of the television 100 are responsive to the remote control commands. The television 100 further includes an interface panel 110 that is accessible via an external surface of the housing 101, for example at a top, back or side surface of the housing 101. The interface panel 110 includes one or more interfaces for receiving or outputting various forms of multimedia data. As shown, the interface panel 110 includes an IN component 112 that includes, for example, an S-video receptacle 122 and audio-visual receptacles 124, and a digital versatile disk (DVD) IN component 114 that is configured to receive video data and audio data from an external DVD player or other multimedia source. In particular, the DVD IN component 114 includes a plurality of receptacles 126 that can receive component video and audio. The panel 110 also can include an OUT component 116 that has receptacles 128 to provide video data and/or audio data to another television or recording device, such as a personal video recorder (PVR) or an external DVD player/recorder. An RF antenna receptacle 120 also can be incorporated into the panel 110 to receive multimedia data via RF transmissions.

In at least one embodiment, the panel 110 further includes a network interface 118 that includes a network receptacle 130 that can be connected to any of a variety of packet-based data networks. The receptacle 130 can be connected to an Internet Protocol (IP)-based network, for example an Ethernet network or an asynchronous transfer mode (ATM)-based network. Further, in a particular embodiment, the network interface 118 can include an Ethernet interface, and as such, the network receptacle 130 can be an RJ-45 receptacle that is configured to receive an Ethernet cable that is connected to an Ethernet-based network. The television 100 can utilize the network interface 118 to receive multimedia data, for example video data, audio data, or video game data, over a packet-based network for processing at the television 100. Moreover, the network interface 118 may be used by the television 100 to forward information to another networked device, such as another networked television 100. The forwarded information may include, for example, processed multimedia data or information associated with the multimedia data, information associated with a video game being played at the television 100, and the like.

As illustrated in FIG. 1, the panel 110 further can include one or more modular card receptacles 132 (also commonly referred to as "expansion slots") to interface with one or more modular cards (also commonly referred to as "expansion cards") to enhance the functionality of the television 100. The modular cards can include, for example, a multimedia decoder modular card 140, a wireless network interface modular card 142, an audio receiver modular card 144, and the like. In a particular embodiment, the modular card receptacles 132 and the corresponding modular cards 140, 142, and 144, may be implemented using a standard architecture, such as a Peripheral Component Interconnect (PCI)-compliant architecture, an Industry Standard Architecture (ISA)-compliant architecture, or a Personal Computer Memory Card International Association (PCMCIA)-compliant architecture. Alternatively, the modular card receptacles 132 and the corresponding modular cards 140, 142, and 144 may be implemented using a proprietary architecture, or a combination of standard and proprietary architectures.

To customize the functionality of the television 100, modular cards may be added or removed from the television by inserting or removing the modular cards from their corresponding modular card receptacles. For example, the panel 110 may include an opening in the housing for each modular card receptacle 132 and each modular card receptacle 132 may receive a modular card that is inserted through the corresponding opening so that the contacts of the modular card receptacle interface are brought into secure contact with the contacts of the receiving modular card receptacle 132. Alternatively, part or all of the panel 110 can be temporarily removed to install the modular card in a modular card receptacle 132. In at least one embodiment, some or all of the modular cards may include one or more interface receptacles that are accessible at the panel 110 to interface with other components.

In a particular embodiment, the incorporation of one or more modular cards into the television 100 allows for an expansion of the available functionality of the television 100. For example, the television 100 may incorporate the wireless network interface modular card 142 to provide wireless connectivity for the transmission of information to other networked devices. Moreover, the television 100 may incorporate the multimedia decoder modular card 140 to process multimedia data. The processing performed by the multimedia decoder modular card 140 may include, for example, decoding or transcoding encoded multimedia data, encoding non-coded multimedia data, decrypting encrypted multimedia data, and the like.

In an embodiment, the multimedia data processed by the decoder modular card 140 may be obtained from an external multimedia device, such as a DVD player, via the interfaces 122-128. Alternatively, the multimedia data may be received as a multimedia data stream via the network interface 118 or via the wireless interface modular card 142. The video content of the resulting processed multimedia data may be displayed on the display 102 or the resulting processed multimedia data may be provided to one or more networked devices via the network interface 118 or the wireless network interface modular card 142.

The television 100 can also incorporate the audio receiver modular card 144 to process audio data for output to one or more speakers. In one embodiment, the audio receiver modular card 144 provides many of the features commonly found in separate stereo receivers. The audio data may be received from an external audio device, e.g., a portable music player, via one or more audio inputs 150. Alternatively, the audio data may be received via the network interface 118 or the wireless network interface modular card 142. The resulting processed audio data may be provided to one or more wired speakers via speaker outputs 152 or the resulting processed audio data may be provided to one or more wireless speakers via, for example, the wireless network interface modular card 142.

Figure 2:
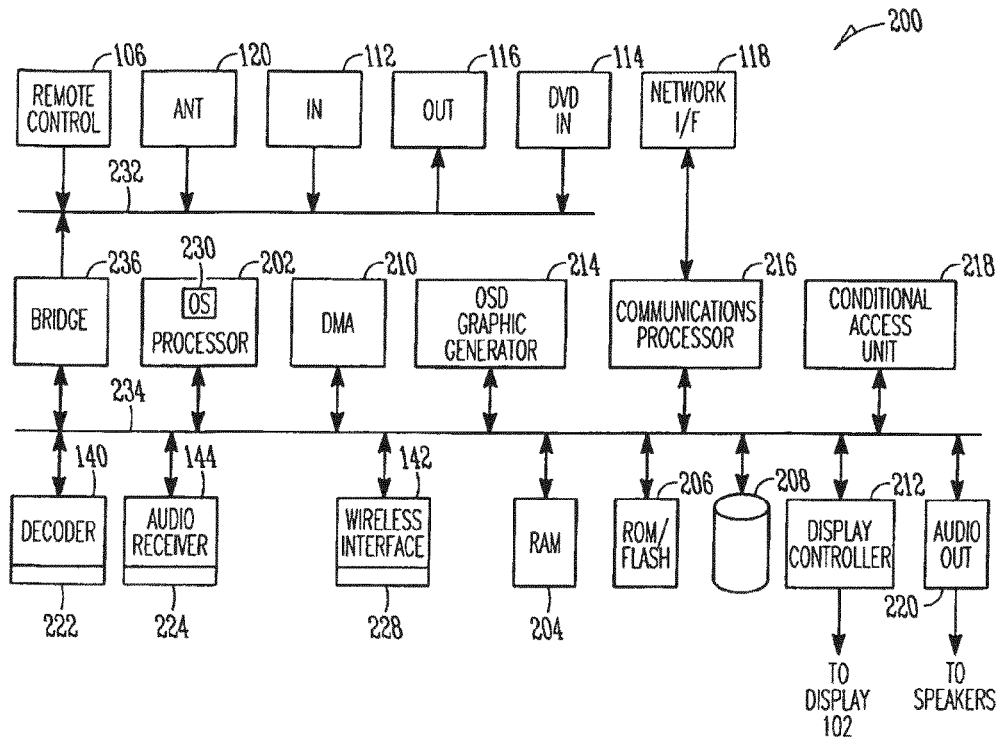
FIG. 2 illustrates a block diagram of an architecture of the networked television of FIG. 1.

Referring to FIG. 2, an example embodiment of an architecture 200 of the television 100 is illustrated in accordance with at least one embodiment of the present disclosure. The television 100 includes one or more processors 202 (which in an embodiment may be referred to as television-based processors), one or more storage devices, such as a random access memory (RAM) 204, a read only memory (ROM) or flash memory 206 or a hard disk 208, a direct memory access controller (DMA) 210 and a display controller 212 coupled to the display 102 (FIG. 1). The television 100 also can include an overlay graphics generator 214, a network communications processor 216 connected to the network interface 118, a conditional access unit 218, and an audio output 220. The television 100 further can include modular card receptacles 222, 224, and 228 connected to the multimedia decoder modular card 140, the audio receiver modular card 144, and the wireless network interface modular card 142, respec-tively. As depicted in FIG. 2, the television 100 can further include the remote control interface 106, the RF antenna interface 120, the IN component 112, the OUT component 116, and the DVD IN component 114 of the panel 110 (FIG. 1). In the illustrated example, some components of the television 100 can be connected to a first bus 232 while other components can be connected via a second bus 234. Further, the busses 232, 234 can be connected by a bridge bus 236.

During operation, the various components of the television 100 communicate information via the busses 232, 234 in order to perform various multimedia related functions. For example, the communications processor 216 provides communications protocol specific processing for data received via the network interface 118 and for data to be transmitted on a packet based network via the network interface 118. Further, the communications processor 216 may implement one or more functions associated with, the Open Systems Interconnection (OSI) seven layer model or the Telecommunications Protocol/Internet Protocol (TCP/IP) stack. During operation, incoming data that is processed by the communications processor 216 can be routed to one or more of the components of the television 100 as appropriate. The DMA controller 210 can control access to the RAM 204 and/or the ROM 206 by the components of the television 100. Moreover, the overlay graphics generator 214 can generate overlay graphics that overlay the display graphics that are output to the display 102 by the display controller 212.

In a particular embodiment, the modular cards 140-144 may communicate information with each other and with other components of the television, for example, the processor 202 or the display controller 212, using the modular card receptacles 222-228 and the bus 234. For example, the wireless network interface modular card 142 or the network interface 118 may be used to receive/transmit audio data for the audio receiver modular card 144. Alternatively, multimedia data may be received via one or more of the RF antenna interface 120, the IN component 112, of the DVD IN component 114. Further, video data that represents video content may be provided from the decoder modular card 140 to the display controller 212 so that the video content is displayed by the display 102. Similarly, audio data representing audio content may be provided from the audio receiver modular card 144 to the audio output 220 for output of the audio content by one or more speakers of the television 100.

Figure 3:
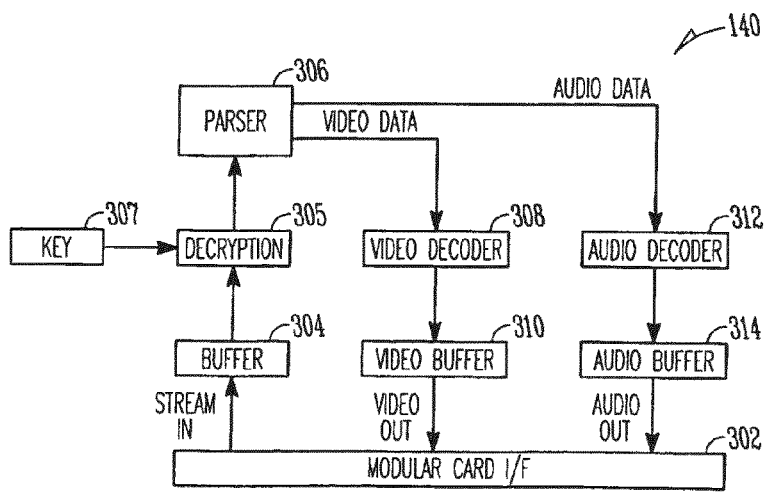
FIG. 3 illustrates a block diagram of an embodiment of a multimedia decoder modular card architecture.

Referring to FIG. 3, an example embodiment of the multimedia decoder modular card 140 is illustrated in accordance with at least one embodiment of the present disclosure. In the example depicted, the multimedia decoder modular card 140 includes a modular card receptacle interface 302, an input buffer 304, a decryption module 305, a parser 306, a video decoder 308, a video output buffer 310, and an audio decoder 312 and an audio output buffer 314. In a particular embodiment, the incoming buffer 304 and the output buffers 310 and 314 may be implemented together as a single buffer.

During operation, incoming multimedia data that is to be processed by the decoder modular card 140 is buffered in the incoming buffer 304. In at least one embodiment, the multimedia data is part of an MPEG data stream. Accordingly, the parser 306 parses the multimedia data to identify the relevant video and/or audio data to be processed. Then, the parser 306 provides the video data to the video decoder 308. The video decoder 308 decodes, or transcodes, the video data and the resulting decoded/transcoded data can be stored in the outgoing video buffer 310 before being provided to the bus 234 (FIG. 2) for transmission to one or more components of the television 100. Similarly, the audio decoder 312 decodes or transcodes the audio data. Audio data is decoded/transcoded by the audio decoder 312 and the resulting decoded/transcoded audio data is buffered in the outgoing audio buffer 314 before being provided to the bus 234 for transmission to one or more other components of the television 100.

Alternatively, in one embodiment, the received multimedia data includes non-coded multimedia data. In this instance, the video decoder 308 also may provide a video encoder to encode the video data to generate encoded video data, for example MPEG data, and the audio decoder 312 may include an audio encoder to encode the audio data to generate encoded audio data.

In at least one embodiment, the received multimedia data is encrypted or otherwise protected to prevent unauthorized access to the multimedia content. Accordingly, in at least one embodiment, the integrated decoder modular card 140 further comprises a decryption module 305 to process the protected multimedia data to generate unprotected multimedia data using a decryption key 307 supplied by, for example, a provider of the protected multimedia data. In one embodiment, the decryption module 305 processes the protected multimedia data before it is provided to the parser 306. Alternatively, the decryption module 305 could be implemented at the output of the parser 306 or as part of the decoders 308 and 312.

Figure 4:
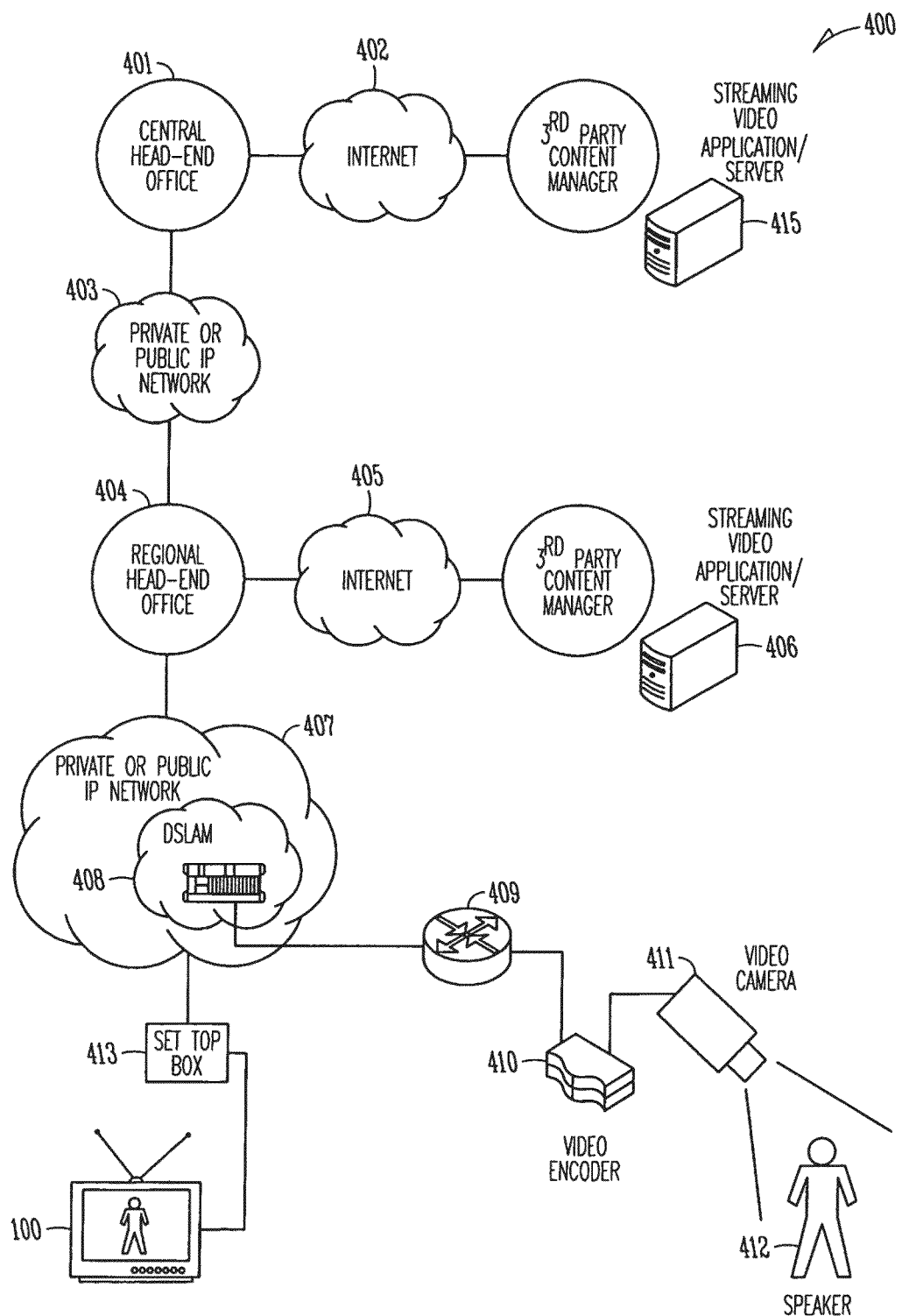
FIG. 4 illustrates an example embodiment of a networked television coupled to a network.

FIG. 4 illustrates an example of the connection of a television such as the one illustrated in FIGS. 1, 2, and 3, or other multimedia processing device, to a network. Referring to FIG. 4, a system 400 includes a television 100, a set top box 413, and one or more public or private networks 403 and 407. The network 407 to which the STB 413 is connected may include a digital subscriber line access multiplexer (DSLAM) 408. The television 100 may be connected to regional video distribution servers 406 and/or central video distribution servers 415 via the regional office 404 and the central office 401, and the networks 405 and 402, respectively. The system 400 may further include a video sensor or source 411, which may be operated by a third party 412. The video source 411 generates or records video content, which in an embodiment is then encoded by a video encoder 410. The video encoder 410 may digitize and/or encrypt the video content. A router 409 couples the video source 411 to the public or private network 407.

In an embodiment, video content stored in the servers 406, 415 originates from a third party 412, and can be accessed by one or more subscribers on the television 100. In another embodiment, the operator/owner of the network 400, the IPTV service provider, supplies the content to be displayed on the television 100. Whether the video content is supplied by a third party or an IPTV service provider, the system 400 may be a closed IPTV system. That is, a user must subscribe to the IPTV system to have access to some or all of the programming available on the system.

In an embodiment, the third party content databases 406, 415 are mapped to the IPTV network 400 via an IP address of the databases. The IPTV service provider associates the content of those databases 406, 415 with a particular assigned channel on the IPTV network 400. Then, to provide access to this third party content to the proper subscribers, the IPTV service provider either unicasts the content to each STB that is authorized to view this content, or multicasts the content to all STBs on the network 400 and installs in the STBs that should have access to the programming an authorization code to permit access to the third party video content.

In an embodiment, the subscribers of the IPTV network that are granted access to such third party video content is determined by the third party content manager. The third party content manager may provide a list of such subscribers to the IPTV service provider, and the IPTV service provider unicasts or multicasts the third party content to theses subscribers. The authorized list of subscribers may be determined by setting parameters that identify membership in a class, club, organization, or company. The authorized subscribers that may view the third party content can also be determined by some other factor such as via a zip code, an area code, a market zone, and a geographic zone. The creation and modification of such a list of subscribers may be through a web-based module.

Figure 5:
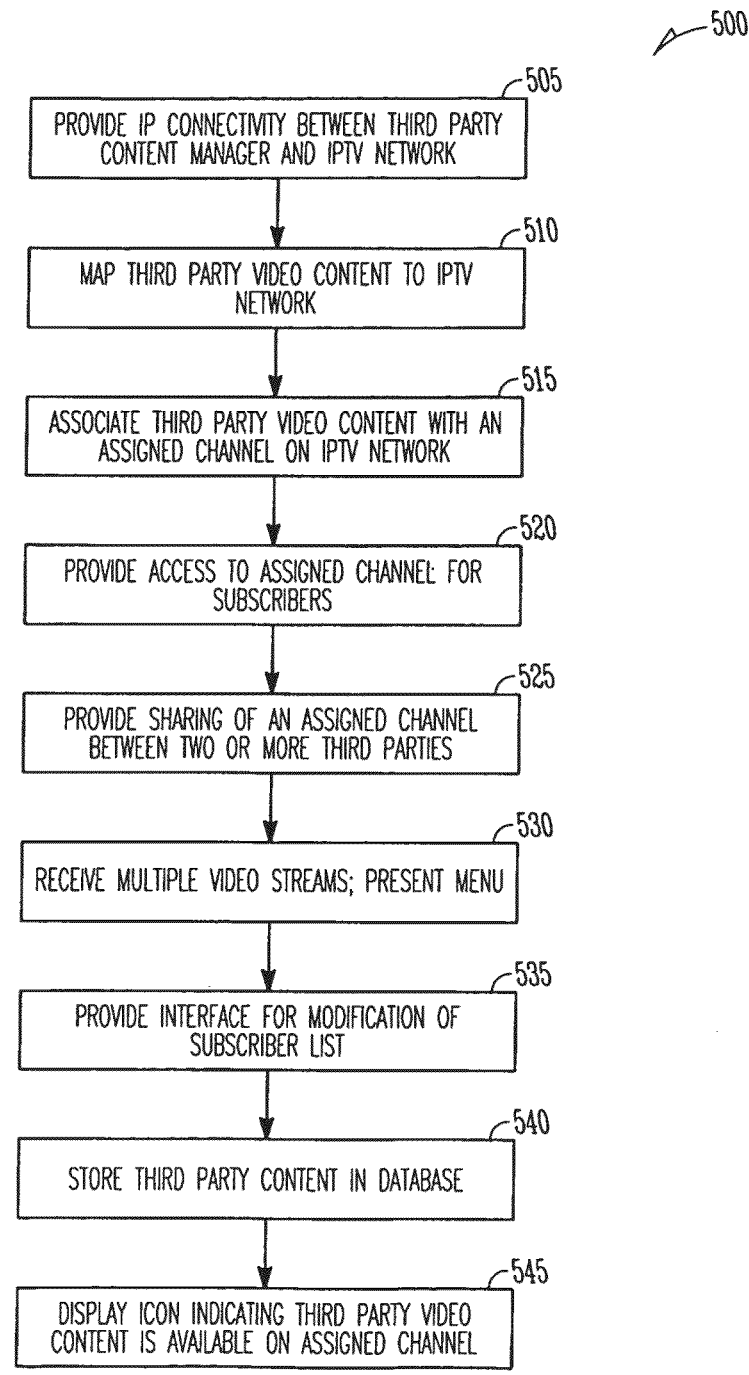
FIG. 5 illustrates an example embodiment of a process to distribute third party content over an IPTV system.

FIG. 5 illustrates an example embodiment of a process 500 to provide third party or local programming to a closed IPTV network. At operation 505, IP connectivity is provided between a third party content manager and the closed IPTV network. At operation 510, the video content of the third party content manager is mapped to the closed IPTV network. In an embodiment, this mapping is done by associating an IP address of the third party video content database with the closed IPTV network. At operation 515, the video content of the third party content manager is associated with an assigned channel on the IPTV network. This is normally done by the IPTV service provider, and can be implemented at the back-end (e.g., the STB) in connection with a multicasting of the third party video content, or at the front end of the IPTV service provider in connection with a unicast. After operation 515, all authorized subscribers are provided access to the third party video content at operation 520.

In another embodiment, as indicated at operation 525, an assigned channel may be shared among two or more third party entities. These third parties may be related such as a library system and a recreation department of a local county government. The third parties may also be completely unrelated to each other. The sharing of the assigned channel by the third party entities may be set up on a time slot basis. That is, a first entity may have its content available on the assigned channel from 8 a.m. to 2 p.m. on weekdays, a second third party entity may have its content available from 2 p.m. to 8 p.m. on weekdays, and another third party entity may have its content available on the assigned channel during the weekend. This time sharing of the assigned channel may be managed by the IPTV service provider or it may be managed by the third party content manager. If managed by the IPTV service provider, the IPTV service provider may change the IP address with which a particular assigned channel is associated. This would change the third party database from which the assigned channel receives its content, and of course change the source of the content for that assigned channel. If the third party content manager manages this sharing of the assigned channel, then the third party content manager may simply change the content that is stored in the database whose IP address is associated with the assigned channel.

In another embodiment, as depicted in operation 530, multiple video streams or segments may be associated with a particular third party database, and these multiple video segments may be streamed over the IPTV network and associated with a particular assigned channel on the IPTV system. In such an embodiment, upon selection of the assigned channel, a viewer may be presented with a menu listing the multiple video segments that are available on that channel, and the viewer may then select which video stream or segment that he would like to view.

At operation 535, an interface is provided to allow the third party content manager and/or the IPTV service provider to add, delete, and/or change the list of subscribers that have access to the third party or local video content. This may be implemented through a web-based module, which would permit a third party remote access to such a list of subscribers. At operation 540, the content from the third party content manager is recorded and stored in a database. The storing of the third party content in the database permits a video on demand (VOD) type of system through the assigned channel. Of course the assigned channel may also provide live video data. At operation 545, a subscriber of the IPTV network may notified of the availability of content on the assigned channel. This notification may take the form of an icon or other identifier displayed on a television display unit, a text message displayed on the television display unit, an audible signal sounded by the television display unit, an email message transmitted to the user, or any other means to notify a user of content on the assigned channel.

Figure 6:
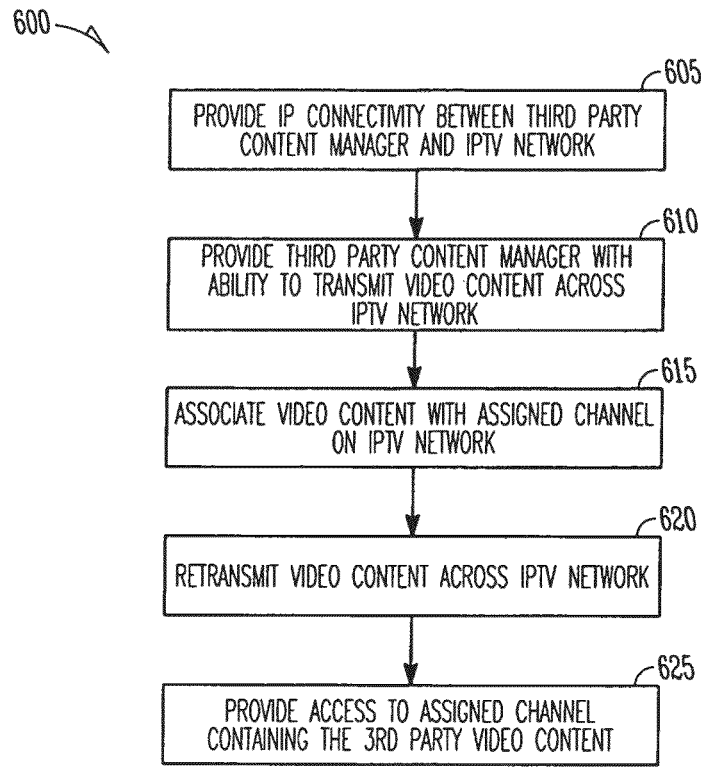
FIG. 6 illustrates another embodiment of a process to distribute third party content over an IPTV system.

FIG. 6 illustrates another embodiment of a process 600 that may be invoked to display third party or local video content on an IPTV system. At operation 605, IP connectivity is provided between a third party content manager and a closed IPTV network. At operation 610, the third party content manager is provided with the ability to transmit video content across the IPTV network. This video content may be stored in a database. At operation 615, the video content in the database is associated with a particular channel on the closed IPTV network. At operation 620, the video content stored in the database is retransmitted across the IPTV network to a plurality of STBs. The STBs are provided access to the assigned channel containing the third party video content at operation 625.

Figure 7:
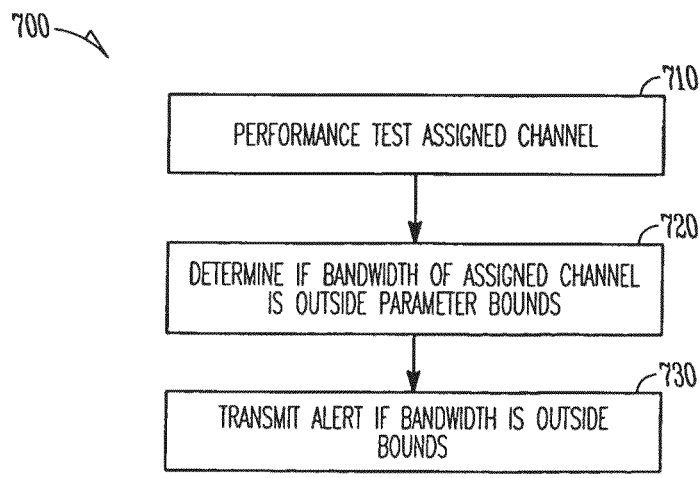
FIG. 7 illustrates an embodiment of a process to monitor the distribution of third party content over an IPTV system.

FIG. 7 illustrates a process 700 that may be used in connection with the distribution of third party or local IPTV programming as illustrated in FIGS. 5 and 6. The process 700 includes operation 710 wherein the channel assigned to carry the third party or local programming is subjected to performance testing. The performance testing includes determining if the bandwidth is outside the bounds of a particular parameter value at operation 720. If the bandwidth is outside the parameter value, an alert is transmitted at operation 730.

Although the provision of third party video content to subscribers of an IPTV network is described in the context of the networked television 100 and a modular card for ease of illustration, these techniques may be implemented in other multimedia processing devices, such as a set top box, using the guidelines provided herein without departing from the scope of the present disclosure. For example, referring to FIG. 8, an illustrative embodiment of a computer system to implement one or more of the disclosed techniques is shown and designated as 800. The computer system 800 may include a set of instructions that can be executed to cause the computer system 800 to execute any one or more of the methods or computer based functions disclosed herein. The computer system 800 may operate as a standalone device or may be connected, for example, using a network, to other computer systems or peripheral devices.

Figure 8:
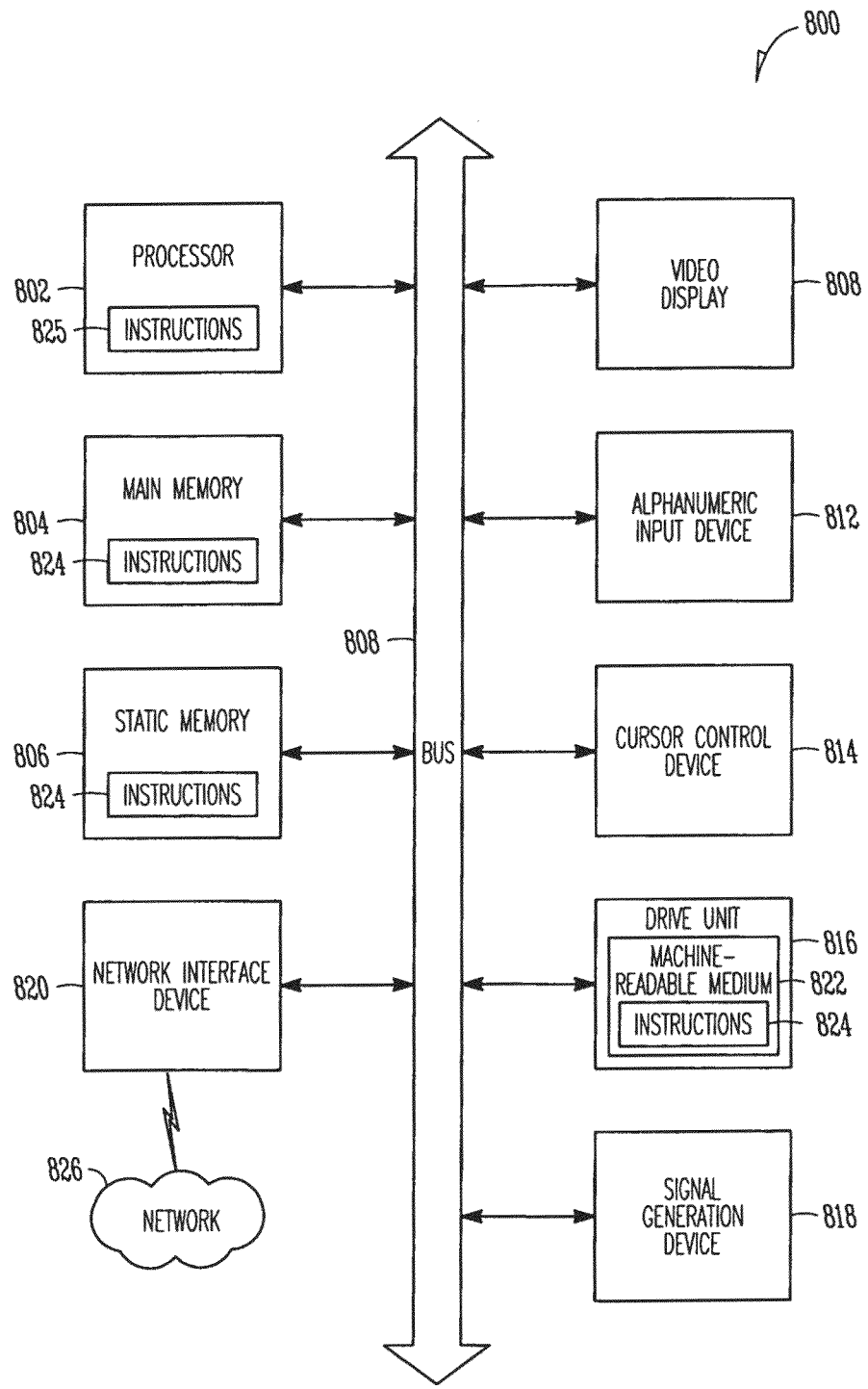
FIG. 8 illustrates an embodiment of an architecture that may be used in connection with an IPTV system.

The computer system 800 of FIG. 8, in a networked environment, may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular phone, a web appliance, a network router, switch, or bridge, or any machine capable of executing a set of web instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 800 includes a processor 802 (for example a central processing unit (CPU), a graphics processing unit (GPU), or both), a main memory 804 and a static memory 806, which communicate with each other via a bus 808. The computer system 800 may further include a video display unit 810 (for example a liquid crystal display (LCD) or a cathode ray tube (CRT)). The computer system 800 also includes an alphanumeric input device 812 (for example a keyboard), a user interface (UI) navigation device 814 (for example a mouse), a disk drive unit 816, a signal generation device 818 (for example a speaker), and a network interface device 820.

The disk drive 816 includes a machine readable medium 822 on which is stored one or more sets of instructions and data structures (for example, software 824) embodying or utilized by any one or more of the methodologies or functions described herein. The software 824 may also reside, completely or at least partially, within the main memory 804 and/or within the processor 802 during execution thereof by the computer system 800, the main memory 804, and the processor 802 also constituting machine readable media.

The software 824 may further be transmitted or received over a network 826 via the network interface device 820 utilizing any one or a number of well-known transfer protocols (for example, HTTP).

While the machine readable medium 822 is shown in an example embodiment to be a single medium, the term "machine readable medium" should be taken to include a single medium or multiple media (for example, a centralized or distributed database, and/or associated caches and servers) that store the one or more sets of instructions. The term "machine readable medium" shall also be taken to include any medium that is capable of storing, encoding, or carrying a set of instructions for execution by the machine and that cause the machine to perform any one or more of the methodologies of the present invention, or that is capable of storing, encoding, or carrying data structures utilized by or associated with such a set of instructions. The term "machine readable medium" shall accordingly be taken to include, but not be limited to, solid state memories, optical and magnetic media, and carrier wave signals.

The above disclosed subject matter is to be considered illustrative and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

The abstract is provided to allow a reader to quickly ascertain the nature and gist of the technical disclosure. The Abstract is submitted with the understanding that it will not be used to interpret or limit the scope or meaning of the claims.

What is claimed is:

1. A non-transitory machine readable storage medium, comprising instructions, wherein responsive to executing the instructions, a processor performs operations comprising:

obtaining video content captured by a camera, wherein the camera captures the video content without capturing audio content;

storing the video content in a video database accessible by a server;

associating an internet protocol address of the video database to an assigned channel of an interactive television network;

configuring the assigned channel for a plurality of parties to supply video content captured by a plurality of cameras without audio content;

obtaining a sharing schedule that is generated without user input;

based on the sharing schedule, assigning to each of the plurality of parties a different time period for presentation on the assigned channel of the video content associated with a corresponding party of the plurality of parties;

associating the assigned channel with set top boxes coupled to the interactive television network; and sending an authorization code to permit access to the video content to the set top boxes coupled to the interactive television network that are identified with a list of subscribers having authorized access to the assigned channel.

2. The non-transitory machine readable storage medium of claim 1, wherein the operations further comprise monitoring the assigned channel and transmitting an alert responsive to a determination that bandwidth usage exceeds a threshold.

3. The non-transitory machine readable storage medium of claim 1, wherein the camera is located at a multi-unit dwelling, and wherein residents of the multi-unit dwelling have access to the video content of the camera via the assigned channel.

4. The non-transitory machine readable storage medium of claim 1, wherein the list of subscribers is generated by equipment of a third party that is different from a service provider operating the server.

5. The non-transitory machine readable storage medium of claim 4, wherein the list of subscribers is based on a common geographic zone associated with each of the set top boxes.

6. The non-transitory machine readable storage medium of claim 4, wherein the list of subscribers is based on a common membership in an organization associated with each of the set top boxes.

7. The non-transitory machine readable storage medium of claim 1, wherein the sharing schedule is received from equipment of a third party that is different from a service provider operating the server.

8. The non-transitory machine readable storage medium of claim 1, wherein the operations further comprise the server providing access to a plurality of video streams available from the video database and access to a menu to list the plurality of video streams.

9. The non-transitory machine readable storage medium of claim 1, wherein an internet protocol gateway couples the camera to the interactive television network, wherein the camera comprises an analog camera.

10. A method comprising:

receiving, by a media processor, video content from a video database coupled to an interactive television network;

receiving, by the media processor, an authorization code from an interactive television server in communication with the video database and a list of media processors authorized to have access to the video content, wherein the interactive television server is operated by a service provider; and displaying, by the media processor, the video content on an assigned channel of the interactive television network, wherein the video content originates from a camera in communication with the interactive television network through a second media processor, wherein the video database is accessible to the interactive television network through an internet protocol address of the video database, wherein the content of the video database is associated with the assigned channel on the interactive television network, wherein the assigned channel is configured for a plurality of parties to supply video content captured by a plurality of cameras without audio content, wherein a sharing schedule is generated for presentation of content on the assigned channel, wherein the sharing schedule is generated without user input, and wherein a third party manages switching between the video content for each of the plurality of parties during different time periods without changing the internet protocol address of the video database, the third party being different from the service provider.

11. The method of claim 10, wherein the sharing schedule is generated by equipment that is operated by the third party, and wherein the plurality of parties are selected from a list of subscribers generated by the equipment of the third party based on a common geographic zone.

12. The method of claim 10, wherein the assigned channel is provided with a same internet protocol address for each of the different time periods, and wherein the plurality of parties are selected from a list of subscribers generated by equipment of the third party based on a common membership in an organization.

13. The method of claim 10, wherein the video content is multicast to authorized subscriber devices associated with a list of subscribers.

14. The method of claim 10, further comprising receiving an alert indicating that bandwidth usage is outside a threshold associated with the assigned channel.

15. The method of claim 14, wherein the alert is received responsive to network performance testing of the assigned channel.

16. The method of claim 10, wherein the operations comprise receiving multiple video streams and presenting a menu describing the multiple video streams.

17. A non-transitory machine readable storage medium, comprising instructions, wherein responsive to executing the instructions, a processor performs operations comprising:

receiving video content from a video database coupled to an interactive television network;

receiving an authorization code from a server in communication with the video database and a list of media processors authorized to have access to the video content, wherein the server is operated by a service provider;

displaying the video content on an assigned channel of the interactive television network; and receiving an alert indicating that bandwidth usage is outside a threshold associated with the assigned channel, wherein the video content originates from a camera in communication with the interactive television network through a second media processor, wherein the video database is accessible to the interactive television network through an internet protocol address of the video database, wherein the content of the video database is associated with the assigned channel on the interactive television network, wherein the assigned channel is configured for a plurality of parties to supply video content captured by a plurality of cameras without audio content, wherein a sharing schedule for the assigned channel is generated, and wherein a third party manages switching between the video content for each of the plurality of parties during different time periods without changing the internet protocol address of the video database.

18. The non-transitory machine readable storage medium of claim 17, wherein the sharing schedule is generated by equipment operated by a third party that is different from the service provider, and wherein the sharing schedule is generated without user input.

19. The non-transitory machine readable storage medium of claim 17, wherein an identifier is utilized to provide authentication for the media processor to view the video content.

20. The non-transitory machine readable storage medium of claim 17, wherein the plurality of parties are selected from a list of subscribers generated by equipment of the third party based on one of a common geographic zone or a common membership in an organization.

* * * * *